United States Patent [19]
Ting et al.

[11] Patent Number: 5,316,745
[45] Date of Patent: May 31, 1994

[54] HIGH PRESSURE STERILIZATION APPARATUS AND METHOD

[75] Inventors: Edmund Y. Ting; Chidambaram Raghavan, both of Kent, Wash.

[73] Assignee: Flow International Corporation, Kent, Wash.

[21] Appl. No.: 10,636

[22] Filed: Jan. 28, 1993

[51] Int. Cl.⁵ ............................................. A23L 3/015
[52] U.S. Cl. ........................................ 422/295; 422/39; 99/461
[58] Field of Search ..................... 422/39, 295; 99/461

[56] References Cited

U.S. PATENT DOCUMENTS

| | | | |
|---|---|---|---|
| 1,355,476 | 10/1920 | Hering | 422/39 |
| 1,711,097 | 4/1929 | Kratzer | 422/39 |
| 1,728,333 | 9/1929 | Crowther | 422/39 |
| 2,069,820 | 2/1937 | Dodge | 422/39 |
| 4,030,406 | 6/1977 | Wander et al. | 422/1 |

FOREIGN PATENT DOCUMENTS

| | | | |
|---|---|---|---|
| 217747 | 8/1958 | Australia | 422/39 |
| 802225 | 10/1958 | United Kingdom | 422/39 |

*Primary Examiner*—Robert J. Warden
*Assistant Examiner*—Hien Tran
*Attorney, Agent, or Firm*—Hughes & Multer

[57] ABSTRACT

An ultra high pressure sterilizing apparatus and method comprising a cylinder and plunger assembly that operates on a power compression stroke where material to be sterilized is alternately pressurized and depressurized in the cylinder chamber. The cylinder and plunger assembly also moves on a discharge and intake stroke where material that has been sterilized through pressurizing and depressurizing cycles is removed from the chamber through selectively operable valve means, and a fresh quantity of material to be sterilized is moved into the cylinder chamber for another set of pressurizing and depressurizing cycles.

19 Claims, 8 Drawing Sheets

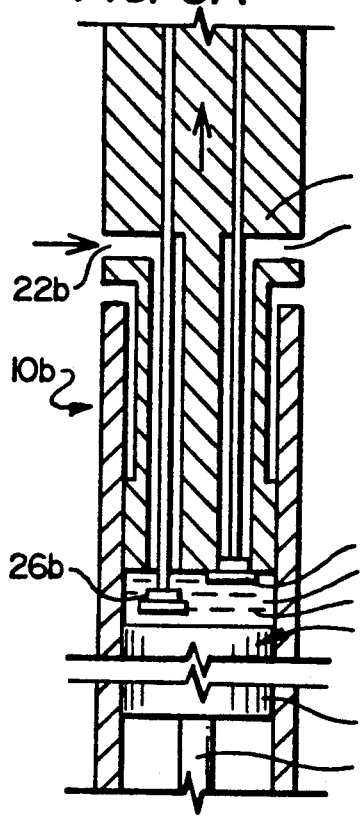
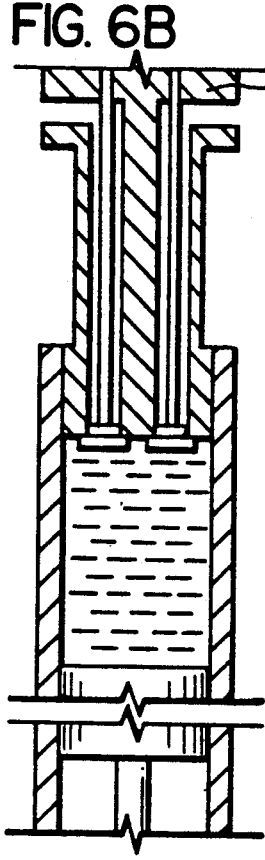
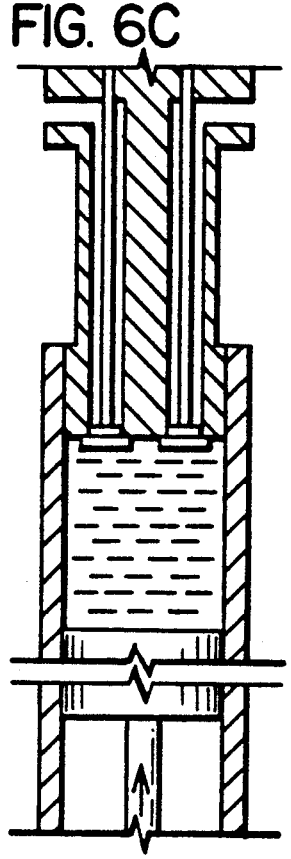
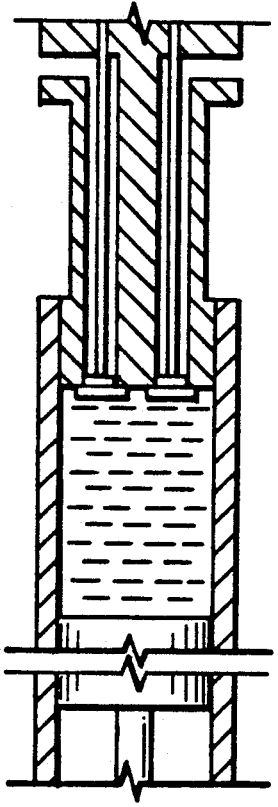
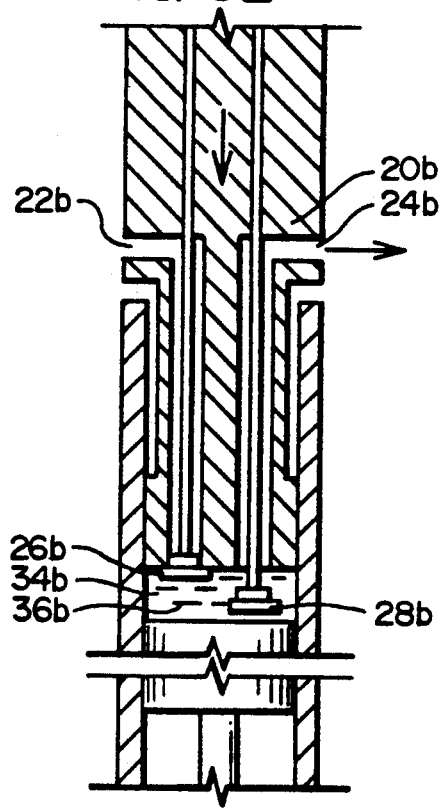

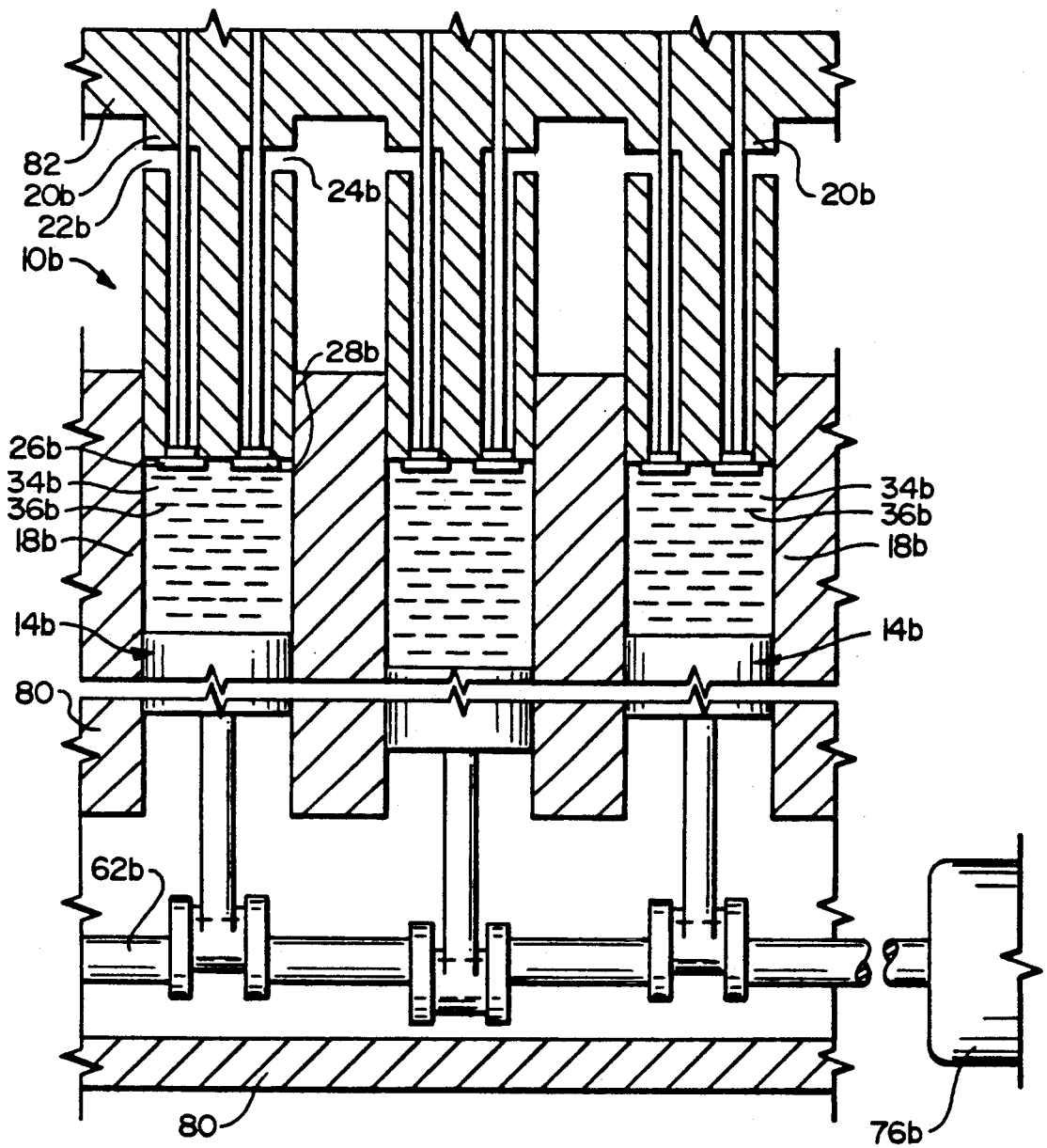

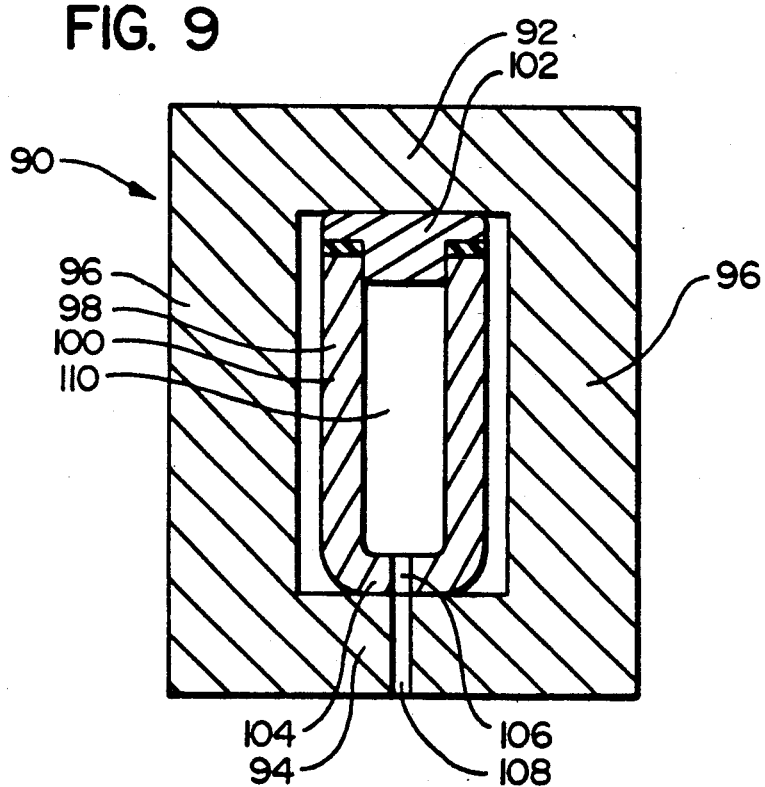

HIGH PRESSURE STERILIZATION APPARATUS AND METHOD

BACKGROUND OF THE INVENTION (a) Field of the Invention

The present invention relates to the sterilization or other treatment of materials by application of a very high pressure.

(b) Background Art

The effects of high pressure (up to 120,000 PSI) on food micro organisms was first studied as early as 1899 on milk, meats, fruits and vegetables. Early researchers demonstrated some astonishing results. After storage at room temperature, peach and pear samples preserved by brief exposure to high pressures had not deteriorated after five years. Meat that was packaged after such sterilization showed no signs of microbial deterioration when opened after three months of storage. The shelf life of milk was extended by one day. Many foods appear to be particularly favorable to ultra high pressure food preservation, such as acidic foods that naturally inhibit surviving spore nucleation. Examples of recent work indicated that freshly squeezed orange juice treated by this high pressure process showed no signs of contamination after seventeen months of storage. A search of the patent literature discloses a number of methods of pressurizing various products as a means of sterilization. These are the following:

U.S. Pat. No. 1,355,476 (Hering) discloses an apparatus for destruction of cellular structures, such as bacteria or other small living organisms, by means of rapid successive positive and negative pressure changes in a confined liquid. In one arrangement there is a plunger and cylinder to create the pressure. In another arrangement there is a hammer which is permitted to drop onto a plunger "P" which causes an abrupt increase in pressure, after which the hammer is raised to release the pressure.

U.S. Pat. No. 1,711,097 (Kratzer) shows a system for sterilizing substances. This is accomplished by subjecting the substance to be sterilized to a pressure considerably in excess of atmospheric pressure and permitting it to remain at that pressure for a time sufficient to cause the excess pressure gases to permeate the cell envelope. The cell is then suddenly subjected to a very much reduced pressure, and it is alleged that the result is that the contained gases of the cell envelope suddenly expand, rupturing the same and killing the cell.

U.S. Pat. No. 1,728,334 (Crowther) shows a system for sterilizing where the material is placed in a tube 42. Then a gaseous medium under pressure is directed through an inner tube 44 to pressurize the area within the tube 42 and cause sterilization of the contained material.

U.S. Pat. No. 2,069,820 (Dodge) shows a sterilizing apparatus where there is a plunger 6 that is moved inwardly on a compression stroke and outwardly on the return stroke by a crank 7. At the opposite end of the cylinder there is an auxiliary plunger 10 that is held in place by a spring 11. Fluid to be sterilized is directed into a compression chamber 5 through an inlet 14 positioned adjacent to the plunger 6 in its retracted position. An outlet port 15 is positioned at the opposite end of the chamber 5. The cycle is shown in FIG. 3, and during the period "A", fluid is directed through the inlet 14 into the chamber 5. The previously sterilized fluid in the chamber 5 is pushed through the outlet 15, but the fluid taken in does not move totally to the outlet 15, so that it does not mix with the sterilized fluid that has been discharged. During portion "B" of the cycle, the plunger 6 is moved inwardly to compress the fluid, and during the cycle portion "C" the plunger 6 is retracted. In the final interval "D" of the cycle the plunger 6 is drawn further out creating subatmospheric pressure in the fluid, and following this interval the valves 17 and 16 for the inlet and outlet 15 and 17, respectively, are opened to place an additional charge of fluid into chamber 5 and cause the sterilized fluid to flow out the port 15. The auxiliary plunger 10 is pushed outwardly to some extent against the spring 11 during the compression stroke, and then the spring 11 pushes the plunger 10 inwardly on the return stroke of the plunger 6. It is also stated that the fluid is compressed to some extent, and the energy released in the expansion of the fluid in the chamber 5 subsequent to compression is returned back to the plunger 6 and to the flywheel. It is further stated that three or more compressors may be used so that there can be practically a continuous flow of fluid which is being treated, and that repeated compression strokes could be used on the fluid.

U.S. Pat. No. 4,030,406 (Wander et al) discloses an apparatus for sterilization by internal heating effects and centrifugal force. The heating is accomplished by friction arising between the product and the moving surface and subjecting the material to centrifugal force causes an increase in pressure.

To the best knowledge of the applicants herein, the sterilization of liquid, semi-liquid and solid materials, such as food products or other products requiring sterilization, by utilizing very high pressure, has not experienced any substantial commercial application. Accordingly, it is the object of the present invention to provide an apparatus and method which has certain desirable characteristics which enhance the capability of properly accomplishing the sterilization in a commercially feasible manner.

SUMMARY OF THE INVENTION

The apparatus of the present invention is arranged to sterilize a material, such as a liquid material, or a solid material in a liquid. This invention allows for repeated pressurization of a material to increase sterilization effectiveness without wasting the energy associated with each pressurization cycle.

This apparatus comprises a cylinder and plunger assembly having two pressurizing components, namely a cylinder component and a plunger component. The cylinder component comprises a cylinder housing defining a compression chamber, and the plunger component comprises a plunger mounted in the cylinder.

The assembly is arranged for movement on two stroke paths. First, there is power stroke path where at least a portion of at least one of these cylinder and plunger components moves on a compression stroke to reduce volume of the chamber by a relatively smaller amount, so as to pressurize material in the chamber to a high pressure level, and then to move on a return stroke to expand the volume in said chamber so as to reduce the pressure level in the chamber.

The second stroke path is a discharge and intake stroke path where at least a portion of at least one the cylinder and plunger components moves on a discharge stroke to reduce the volume of the chamber a relatively greater amount to discharge sterilized material from the chamber and to move on an intake stroke to expand the volume of the chamber to admit material to be sterilized into the chamber.

There is material inlet and an outlet means arranged to direct the material to be sterilized into the chamber and to discharge the sterilized material from the chamber.

Also, there is actuating means comprising a pressurizing power means to cause the assembly to move on said power stroke path so as to pressurize the material in the chamber to a sterilizing pressure level. The actuating means also comprises intake and discharge means to cause the assembly to move on said discharge and intake path to admit material to be sterilized into the chamber and to discharge said material from the chamber.

There is valve means to open the inlet means and to close the outlet means for the intake stroke, to close the inlet means and open the outlet means for the discharge stroke, and to close both the inlet and the outlet means for the period during the compression stroke and return stroke.

In one embodiment, the cylinder comprises a sidewall and an end wall defining the compression chamber, and the plunger moves relative to the sidewall and the end wall in both the power stroke path and on the intake stroke path. Desirably, the valve means is positioned adjacent to the end wall of the cylinder housing.

Also in the first embodiment, the pressurizing power means has an operative connection to the plunger means to cause the plunger means to move on the power stroke path, but the plunger means is capable of separating a power connection with the pressurizing power means to travel on the discharge and intake stroke path.

In one arrangement, the pressurizing power means comprises cam means engaging the plunger means, and the plunger means is arranged to become disengaged from the cam means during the discharge stroke and the intake stroke.

In yet another arrangement, the pressurizing power means comprises crank shaft means engaging the drive rod means, which in turn is in engagement with the plunger means during the power stroke path and is disengaged from said plunger means on said discharge stroke and said return stroke.

Further, in another feature of the present invention, there is means to direct material to be sterilized into the chamber to cause the plunger means to move along the intake stroke, and to draw the material out of the chamber to cause the plunger means to move on the discharge stroke.

Also, in a preferred embodiment, there is a plurality of the cylinder and plunger assemblies, each comprising a cylinder component and a plunger component. The cylinder and plunger components are connected to the pressurizing power means in a manner that as the pressure and power means is delivering power to one of said cylinder and plunger assemblies on the compression stroke, another of said cylinder and plunger assemblies is on its return stroke to receive energy of said material expanding in its related compression chamber and return such energy to said pressurizing power means. Desirably, in this arrangement the pressurizing power means comprises crank shaft means operatively connected to said cylinder and plunger assemblies.

In another arrangement, the cylinder housing comprises a sidewall and an end wall defining the compression chamber, and the end wall is movable relative to the sidewall, in a manner that the end wall moves relative to the sidewall along the discharge and intake stroke paths.

Also, in the preferred arrangement, the cylinder and plunger assembly or assemblies go through a plurality of cycles of compression strokes and return strokes to cause the material in the chamber to become sterilized, after which the material subjected to these cycles of compression and return strokes is discharged from said chamber.

In the method of the present invention the apparatus is operated through the cycles described above to accomplish the sterilization.

In another embodiment, solid material is placed in a pressure vessel with a liquid. The liquid in the vessel is then pressurized with the cylinder and plunger assembly of the present invention.

Other features of the present invention will become apparent from the following detailed description.

BRIEF DESCRIPTION OF THE DRAWINGS

FIGS. 6A through 6E are five schematic figures, similar to FIGS. 1A through 1E, illustrating the operation of a third embodiment of the present invention;

FIG. 7 is a schematic drawing showing the third embodiment more completely;

FIG. 9 is a schematic drawing showing yet a fifth embodiment of the present invention.

DESCRIPTION OF THE PREFERRED EMBODIMENTS

Figure 1A:
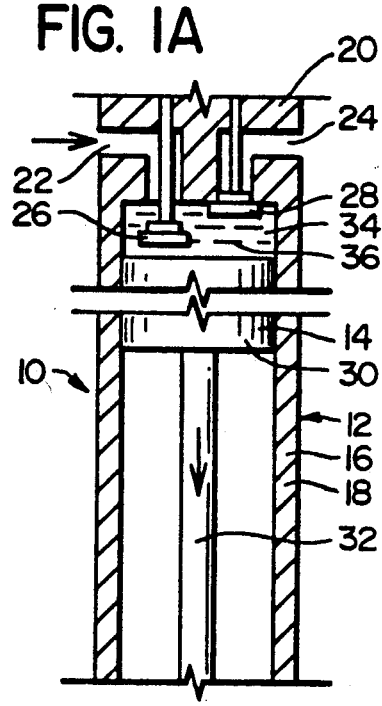
FIGS. 1A through 1E are a series of somewhat schematic drawings of the cylinder and plunger assembly of a first embodiment of the present invention to demonstrate the sequence of steps in a cycle of the present invention where the material to be sterilized is directed into the pressure chamber, a series of pressurizations are accomplished, and the material sterilized by such pressurizations is discharged from the chamber.

In the following disclosure of the present invention, there will first be a rather general description of the basic apparatus and sequence of the operation of the first embodiment of the present invention. This will be done with reference to FIGS. 1A through 1E which illustrates somewhat schematically the basic method and apparatus of the cylinder and plunger assembly of the first embodiment of the present invention.

There is shown in each of FIGS. 1A through 1E a cylinder and plunger assembly 10 comprising a cylinder 12 and a plunger 14. The cylinder 12 comprises a cylinder housing 16 which in turn is made up of a cylindrical side wall 18 and an end wall 20. The end wall 20 has an inlet 22 and an outlet 24, each of which is selectively opened and closed by valve members 26 and 28, respectively. The plunger 14 comprises a plunger head 30 which is mounted for reciprocating motion within the cylinder housing side wall 18, and a plunger rod 32. The cylinder 12 and plunger 14 define a compression chamber 34.

As is common with ultra high pressure systems, the plunger 14 has substantial axial length. However, for ease of illustration only the end portions of the plunger are shown. Also the plunger 14 and rod 32 could be made as a single elongate member.

In general, the sequence of the apparatus shown in FIGS. 1A through 1E is that the material 36 to be sterilized is drawn into the pressurizing chamber 34, after which this contained liquid is pressurized to ultra high pressures (e.g. 40,000 to 55,000 PSI or higher) to sterilize the material by destroying, or disabling the reproduction of, bacteria and possibly other micro-organisms. Then the material that has thus been sterilized is discharged from the chamber 34.

In describing the process as shown in FIGS. 1A through 1E, the material to be sterilized will be assumed to be a liquid or semi-liquid product, such as a food product. However, it is to be understood that a variety of materials or products could be sterilized by this method. Further, packets of material (including solid material) could be sterilized by being placed in packets which are in turn carried by a liquid into a compression chamber 34, or possibly be sterilized without being in packets. For convenience, however, in the following description the material to be sterilized will simply be referred to as the "liquid material".

The sequence of pressurizations of the liquid material 36 that is drawn into the chamber 34 is accomplished applying a very high force against the plunger rod 32 to cause the plunger head 30 to pressurize the liquid material 36 to the ultra high sterilizing pressure. Water (as well as most other liquids) will undergo some degree of compression at such high pressures. For example, at 55,000 PSI and at room temperature, water will compress to as much as about eighty five percent of its volume at atmospheric pressure.

Figure 1B:
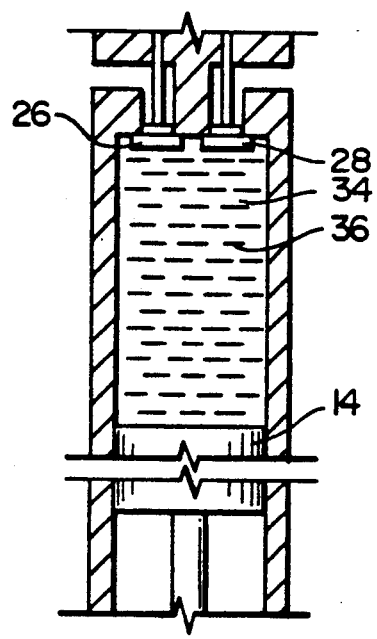

To describe this sequence more particularly, in FIG. 1A, the plunger 14 has just completed its discharge stroke so that it is adjacent to the end wall 20 of the cylinder housing 16. At this time, the inlet valve 26 is moved to its open position, and the plunger 14 begins to move outwardly on its return stroke, with fluid material to be sterilized flowing through the inlet passage 22 and into the chamber 34. When the plunger 14 has completed its inlet stroke, it is in position of 1B. At this time, the inlet valve 26 is closed. Further, the outlet valve 28 has remained closed throughout the portions of the cycle described thus far. In the position of FIG. 1B, the material to be sterilized is at atmospheric pressure (or at some other relatively low pressure), and the plunger 14 is at its furthest outward position.

At this time the liquid material is subjected to a series of pressurizations by the plunger 14 going through a series of compression strokes. In FIG. 1B, the plunger 14 is shown at its precompression position where the liquid material 36 is near or at atmospheric pressure. When the plunger 14 is moved from the position of FIG. 1B on its compression stroke to the position of 1C, it compresses the liquid material 36 up to the desired sterilizing pressure level. Then when the plunger 14 is moved on its return stroke from the position of FIG. 1C to the position of FIG. 1D, the stored energy in the liquid material acts in the manner of a spring to push the plunger 14 outwardly. As will be described later herein, in the present invention this stored energy is able to be utilized in the system to accomplish further pressurization of the same or other liquid material to be sterilized.

Figure 1C:
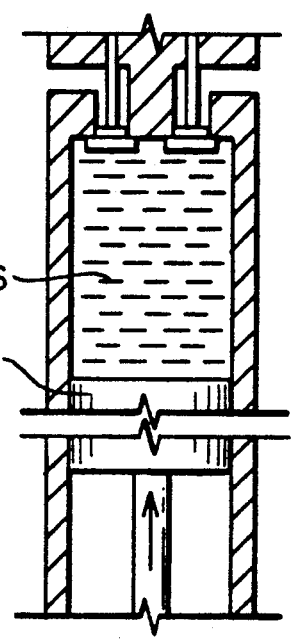
Figure 1D:
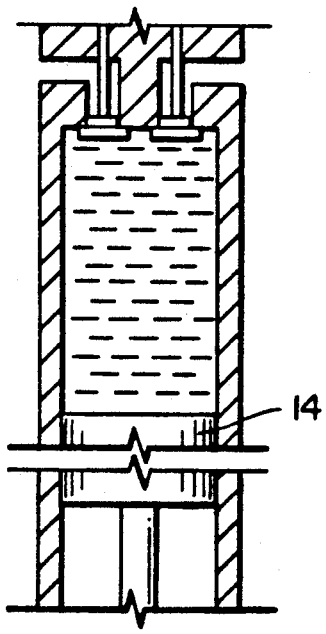
Figure 1E:
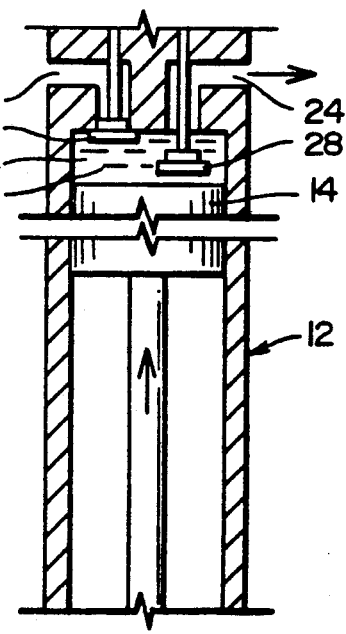

Since a series of pressurizations (i.e. where the liquid material is pressurized and then depressurized) has been found to be more effective in killing or disabling the organisms during the sterilization process, the sequence from FIG. 1B to 1D is repeated a number of times until the sterilization is complete. When the sterilization is complete, then the outlet valve 28 is opened, and the plunger 14 is moved inwardly on a discharge stroke to remove most of the sterilized liquid 36 from the compression chamber 34.

In reviewing the sequence illustrated in FIGS. 1A through 1E, it becomes apparent that the cylinder and plunger assembly 10 moves through what could be termed a power stroke (or more precisely a compression stroke and/or a pressurization stroke), where the plunger is moved with considerable force against the liquid material to cause the pressurization and compression, and then moved on a return stroke (also called the depressurizing stroke) to permit the liquid material to become depressurized and expand. On these strokes the plunger 14 travels a relatively short path. Also, the cylinder and plunger assembly 10 goes through what can be termed a discharge stroke (from the position of FIGS. 1D to 1E) and an intake stroke (from the position of FIGS. 1A to 1C). On these strokes the plunger 14 moves a substantial distance inwardly to discharge most of the liquid material 36, and then outwardly. The power stroke path is characterized in that very substantial force and very high pressures are utilized, and the reduction of volume in the compression chamber 34 is relatively small (on the order of fifteen percent for 55,000 PSI pressure where a water containing material is being sterilized). On the other hand, the discharge and intake stroke path is characterized in that substantially lower pressures are utilized (even as low as atmospheric pressure or lower, for example, on the exhaust stroke if a suction pump is used). Also, the discharge stroke is desirably sufficiently long so that most all of the liquid material is discharged, so that the volumetric rate at which batches of liquid material are sterilized is maximized.

The two valves 26 and 28 are each arranged so that in the closed position, each isolates its related fluid passageway 22 or 24, respectively, from the chamber 34. Thus, during the pressurizing and depressurizing strokes of the related plunger 14, neither the pre-sterilized liquid material nor the discharged sterilized liquid material has any contact with the fluid material 36 in the chamber 34. On the intake stroke of the plunger 14, with only the intake valve 22 being open, the chamber 34 is in communication only with the pre-sterilized liquid material flowing from the passageway 22. Further, on the discharge stroke, only the valve 26 is open, so that the liquid material 36 that has just been sterilized in the chamber 34 is in contact only with the discharge passageway 26 through which the sterilized liquid flows.

Thus, there is total isolation of the pre-sterilized liquid material in the passageway 22 from the sterilized liquid material that is in the passageway 24. The liquid material 36 in the chamber 34 during the sterilizing process that occurs by the pressurizing and depressurizing strokes is totally isolated from both the liquid material in the passageways 22 and 24. Further, in the arrangement of this first embodiment, on the intake and discharge strokes of the plunger 14, the plunger 14 is able to travel substantially the entire length of the chamber 34, and is limited only by the necessity to have a certain amount of clearance for the valves 26 and 28 to operate.

Figure 2:
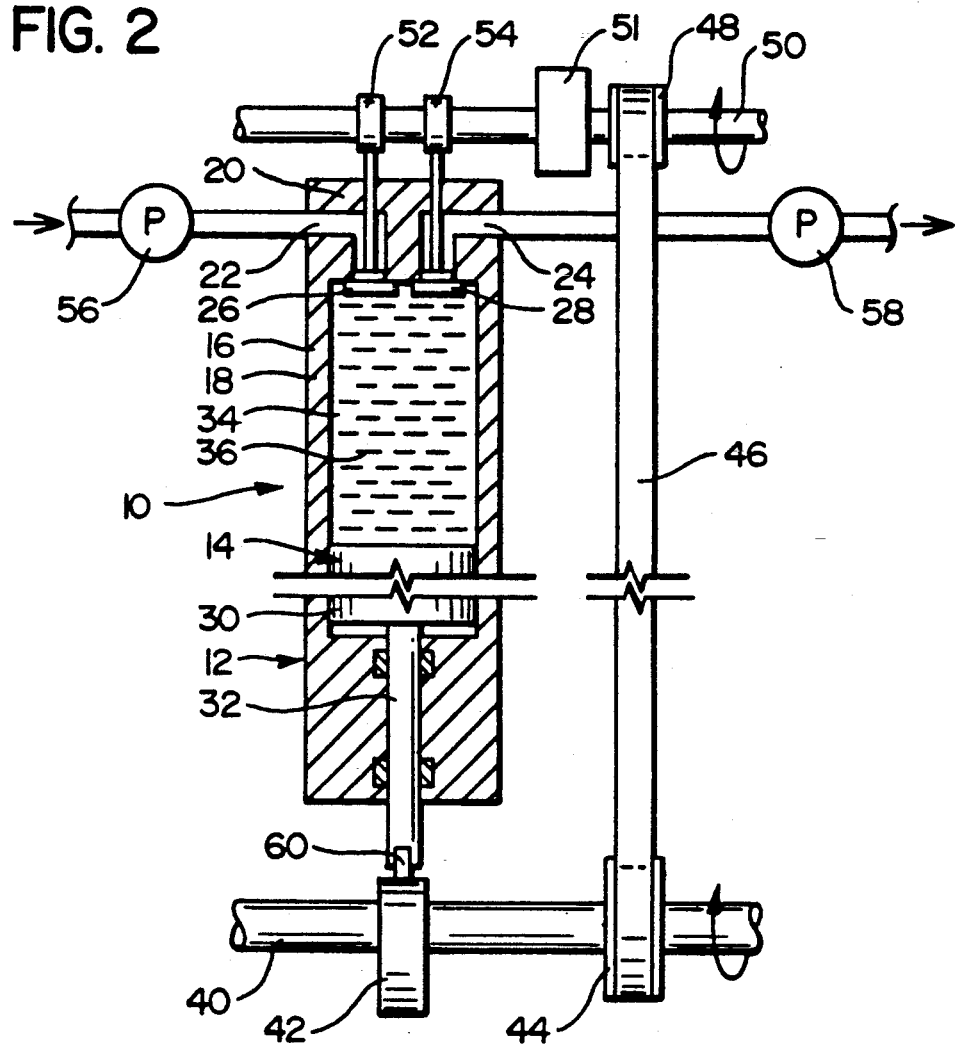
FIG. 2 illustrates schematically the specific embodiment more completely, showing a system having a single cylinder and plunger assembly to accomplish this sterilization.

Reference is now made to FIG. 2 to illustrate somewhat schematically the apparatus of this first embodiment of the present invention which incorporates the basic operating sequence illustrated in FIGS. 1A through 1E. There is shown the aforementioned cylinder and plunger assembly 10 comprising the cylinder 12 and plunger 14, along with the other previously described components 16–32.

Additionally, there is a main power shaft 40 which drives a main cam 42 and also drives a timing gear 44. The gear 44 engages a timing chain 46 that in turn engages a gear 48 mounted to a cam shaft 50. The cam shaft 50 in turn acts through a speed reducing gear transmission 51 to rotate the cams 52 and 54 to open and close the valves 28 and 26. Alternatively, the cams 52 and 54 could have other operative connections to the valves 28 and 26, respectively. For example, these operative connections could be solenoids acting directly on the valves 28 and 26, with the cams 52 and 54 activating solenoid switches which are in turn arranged to move the valves 28 and 26 with precise timing. Alternatively, some totally different timing means could be used, such as a computerized timing system to move the valves 26 and 28.

There is an inlet boost pump 56 to direct the liquid material to be pressurized into the compression chamber 34, and a discharge pump 58 which draws the liquid material 36 out of the compression chamber 34. It will be noted that the plunger rod 32 has a bearing member 60 at its outward end to contact the main cam 42. This contact with the bearing member 60 is such that the plunger 14 is able to move away from the cam 42 on its discharge stroke so as to accomplish the proper discharge of the liquid material 36 from the compression chamber 34, and then move back into contact with the cam 42 at the completion of its intake stroke. It is also to be understood that other needed operating components would be incorporated such as appropriate seal and bearing members. For example, the plunger 14 would be provided with suitable high pressure dynamic seals. Further, the plunger rod 32 would be provided with appropriate bearing members to properly align the plunger 14. Also a flywheel could be connected to the shaft 40 to store energy and return it to the plunger 14.

To describe the operation of the present embodiment, reference is now made back to FIGS. 1A through 1E and also to FIG. 2. When the plunger 14 is in the position of FIGS. 1A and 1E (at the completion of its discharge stroke, and ready to proceed on its intake stroke) the plunger 14 has moved away from the cam 42, so that the plunger rod bearing member 60 is spaced away from the cam 42. To fill the chamber 34 with liquid material to be sterilized and move the plunger 14 back into engagement with the cam 42, the valve 26 is opened, and the pump 56 directs the liquid material 36 under pressure into the chamber 34.

When the filling of the chamber 34 is completed, the timing is such so that the cam 42 is positioned so that the plunger 14 is at its full outward position. Then further rotation of the power shaft 40 cause the cam 42 to bear against the member 60 to drive the plunger 14 inwardly with increasing force to cause the high pressurization and compression of the liquid material 36 now in the chamber 34. This rotation of the cam 34 causing the compression stroke is repeated an adequate number of times so that there is the alternating sequence of high pressurization and then release of pressure, followed by another high pressurization, and so on until the desired number of pressurizing and depressurizing steps have been accomplished. After the cycles of pressurization has been accomplished, then the cam 54 causes the outlet valve to open, and the discharge pump 58 operates to reduce the pressure in the chamber 34 below atmospheric pressure, so as to cause the plunger 14 to be drawn inwardly into the cylinder 12 until it is back at the discharge position shown in FIG. 1E. Then the overall cycle is repeated.

Figure 3:
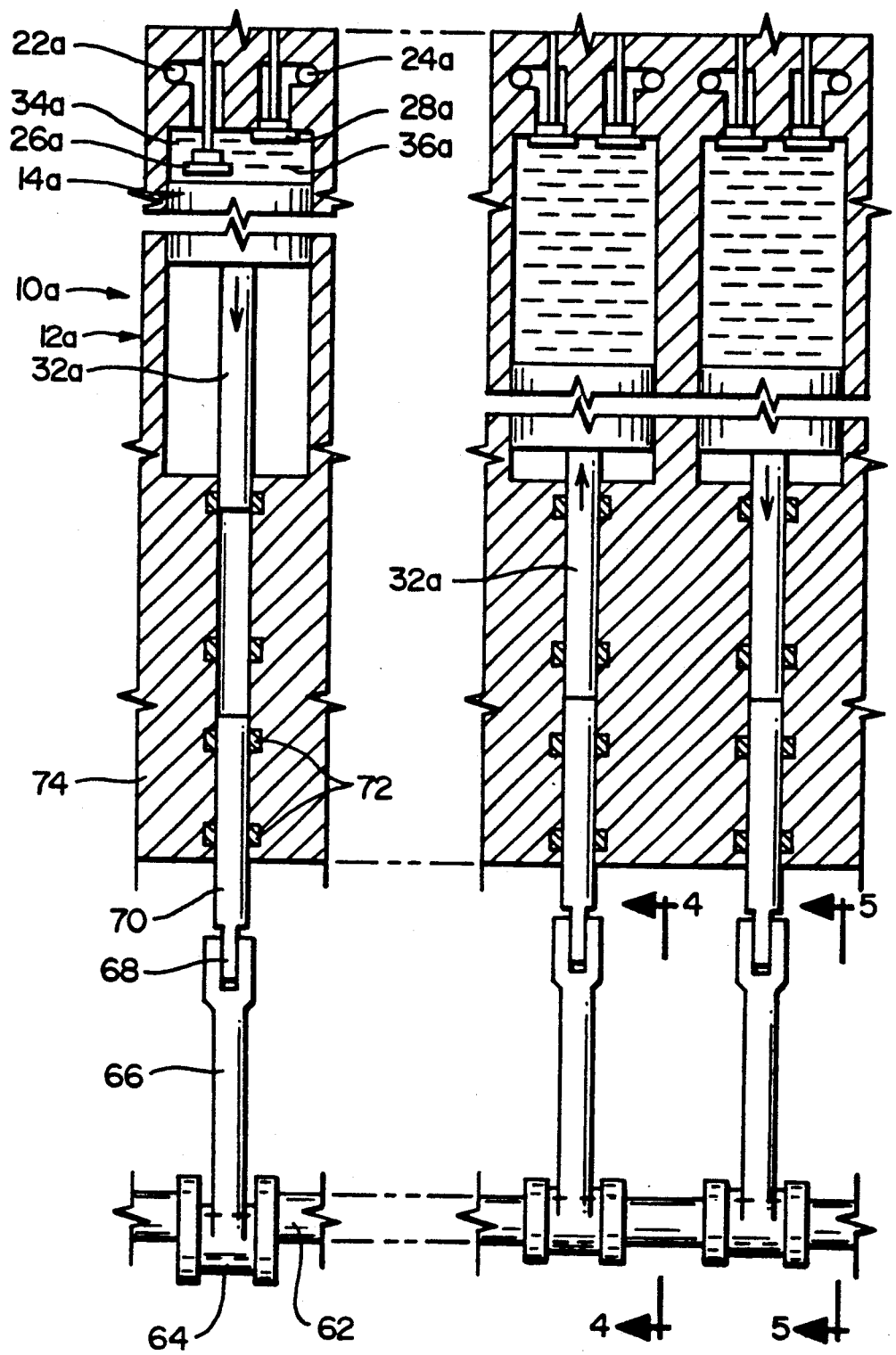
FIG. 3 is a second embodiment of the present invention where a plurality of cylinder and plunger assembly are operated from a crank shaft in a sequential pattern.

A second embodiment is shown in FIG. 3. Components in this second embodiment which are the same as or similar to components of the first embodiment will be given like numerical designations, with an "a" suffix distinguishing those of the second embodiment. This second embodiment is rather similar to the second embodiment, with the following exceptions. First, there is a plurality of cylinder and plunger assemblies 10a. Second, instead of having a main drive shaft 40 with the cam 42, a crank shaft is provided to drive the various cylinder and plunger assemblies 10b.

In FIG. 3, there is a plurality of cylinder and plunger units 10a, only three of which are shown for ease of illustration. Each such cylinder and plunger unit 10a comprises the cylinder 12a and plunger 14a. Further, there are the inlet and outlet passageways 22a and 24a, along with the inlet and outlet valves 26a and 28a. The control devices to actuate the valves 26a and 28a are not shown. Also, the pumps, such as shown at 56 and 58 to direct the liquid material into the chambers 34a and discharge it therefrom, are not shown. It is to be understood, however, that such components (or components similar thereto), as well as other components required for the overall operation, would be incorporated in this second embodiment of FIG. 3.

There is a crankshaft 62 having a plurality of eccentric drive elements 64, each of which connects to a related arm 66. Each arm 66 in turn has a pivot connection at 68 to a related intermediate drive rod 70. Each drive rod 70 is in turn mounted for reciprocating slide motion in bearings 72 in a housing structure 74.

As in the first embodiment, each plunger 14a is arranged so that it is able to travel on a relatively long discharge and intake stroke, and also arranged to travel on a relatively short compression and decompression stroke. In FIG. 3, on the left hand side of the drawing the plunger 14a is shown beginning its intake stroke, while on the right side of FIG. 3, one of the pistons 14a is shown on its pressurizing stroke, while the other plunger is shown on its pressure release stroke.

Further, this second embodiment of FIG. 3 is arranged so that when the plunger 14a moves on its discharge and intake stroke, the plunger rod 32a moves away (and thus out of contact with) its related intermediate drive rod 70. This intermediate drive rod 70 serves to isolate the plunger rod 32a from any significant lateral force components that could otherwise be imparted by the crank arm 66.

The operation of each plunger and cylinder assembly 10a is substantially the same as that described with reference to FIGS. 1A through 1E. Thus, the filling of the chamber 34a with liquid material 36a is accomplished as in the first embodiment by pumping the liquid material 36a into the chamber 34a. The pressurizing and depressurizing strokes are accomplished by the drive connection with the crank shaft 62, and the discharge stroke is accomplished by the discharge pump drawing the liquid material 36a out of the chamber 34a.

Figure 4:
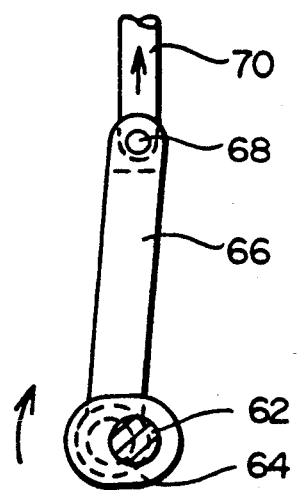
FIG. 4 is a sectional view taken along line 4—4 of FIG. 3.
Figure 5:
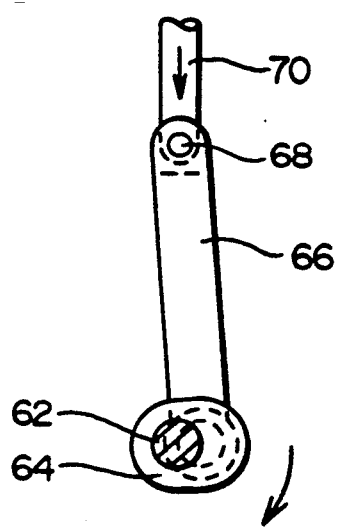
FIG. 5 is a sectional view taken along line 5—5 of FIG. 3.

FIGS. 4 and 5 are sectional views showing two crank shaft locations and two of the crank arms 66 in different operating locations. In FIG. 4, the crank arm is shown on its drive stroke compressing the liquid material in its related chamber 34a. In FIG. 5, the crank arm 66 is shown during the depressurizing portion of the cycle. It is evident that the crank arm 66 in FIG. 4 is being driven by the crank shaft 62 to compress the fluid material 36a in the related chamber 34a, while the opposite is occurring in FIG. 5, where the energy stored in the compressed liquid material 36 is pushing against the crank arm 66 to in turn tend to rotate the crank shaft 62.

FIG. 6A through 6E illustrates a cylinder and plunger assembly of a third embodiment of the present invention. Components of the third embodiment which are similar to those first and second embodiments will be given like numerical designations, with a "b" suffix distinguishing those of the third embodiment. This third embodiment has generally the same operating cycle as in the first two embodiments, except that the intake and discharge strokes, instead of being accomplished by travel of the plunger, are accomplished by movement of the end wall of the cylinder.

As in the first two embodiments, there is a cylinder and plunger assembly 10b comprising a cylinder 12b and a plunger 14b. The cylinder 12b comprises a housing 16b, a cylindrically shaped sidewall 18b and an end wall 20b. The end wall 20b, instead of being fixedly connected to the cylindrical sidewall 18b, is slide mounted within the cylinder side wall 18b. Thus, in a sense, the cylinder end wall 20b acts something in the manner of an auxiliary piston that slides inwardly and then outwardly to accomplish the discharge and intake strokes, respectively. This enables the plunger rod 32b to have a constant direct connection with its drive member, such as the crank shaft 62 shown in the second embodiment.

It is believed that the operation of the second embodiment shown in FIGS. 6A through 6E is readily understandable from the previous description of the first two embodiments. On the intake stroke shown in FIG. 6a, the flow of fluid into the chamber 34b can be accomplished by pumping fluid into the inlet passageway 22b. Further, the discharge stroke can be accomplished by drawing out the liquid material 36b through the outlet passageway 24b. Alternatively, the intake and discharge stroke could be accomplished by moving the end wall 20b itself outwardly and then inwardly after the sterilizing process to reduce the volume in the chamber 34b.

An arrangement is shown in FIG. 7 where a plurality of cylinder and plunger assemblies 10b are all connected to a common crankshaft 62b. There is a first main stationary housing structure 80 that carries the crankshaft 62b, the drive motor 76b, the pistons 14b and the cylinder side walls 18b. Then there is a second movable housing 82 to which the end walls 20b and their related components are mounted. More specifically, these related components that are mounted to the movable housing 82 include the poppet valves 26b and 28b along with related tubing feeding fluid to the intake passageway 22b and withdrawing liquid material from the passageway 24b.

In the arrangement of FIG. 7, during the discharge stroke and the intake stroke, the movable housing 82 is moved toward the housing 80 so as to first move the end walls 20b into their related side cylinder walls 18b. Then the housing 82 is moved away from the housing 80 to accomplish the intake stroke where the liquid material to be sterilized is drawn into the multiplicity of chambers 34b. The timing of the opening of the outlet valves 28b would be accomplished so that on the final compression stroke prior to discharge of the sterilized material, the outlet valve 28b would be opened so that there is no substantial build-up of pressure in the chamber 34b. At the completion of the intake stroke, the housing 82 is then fixedly secured so that it will be able to withstand the substantial loads that would be imparted during the pressurizing/depressurizing cycles. With the movable housing 82 secured in place, then the various pistons 14b are operated by rotation of the crank shaft 62b as described previously herein to cause the pressurizing and depressurizing of the liquid material 36b.

Figure 8:
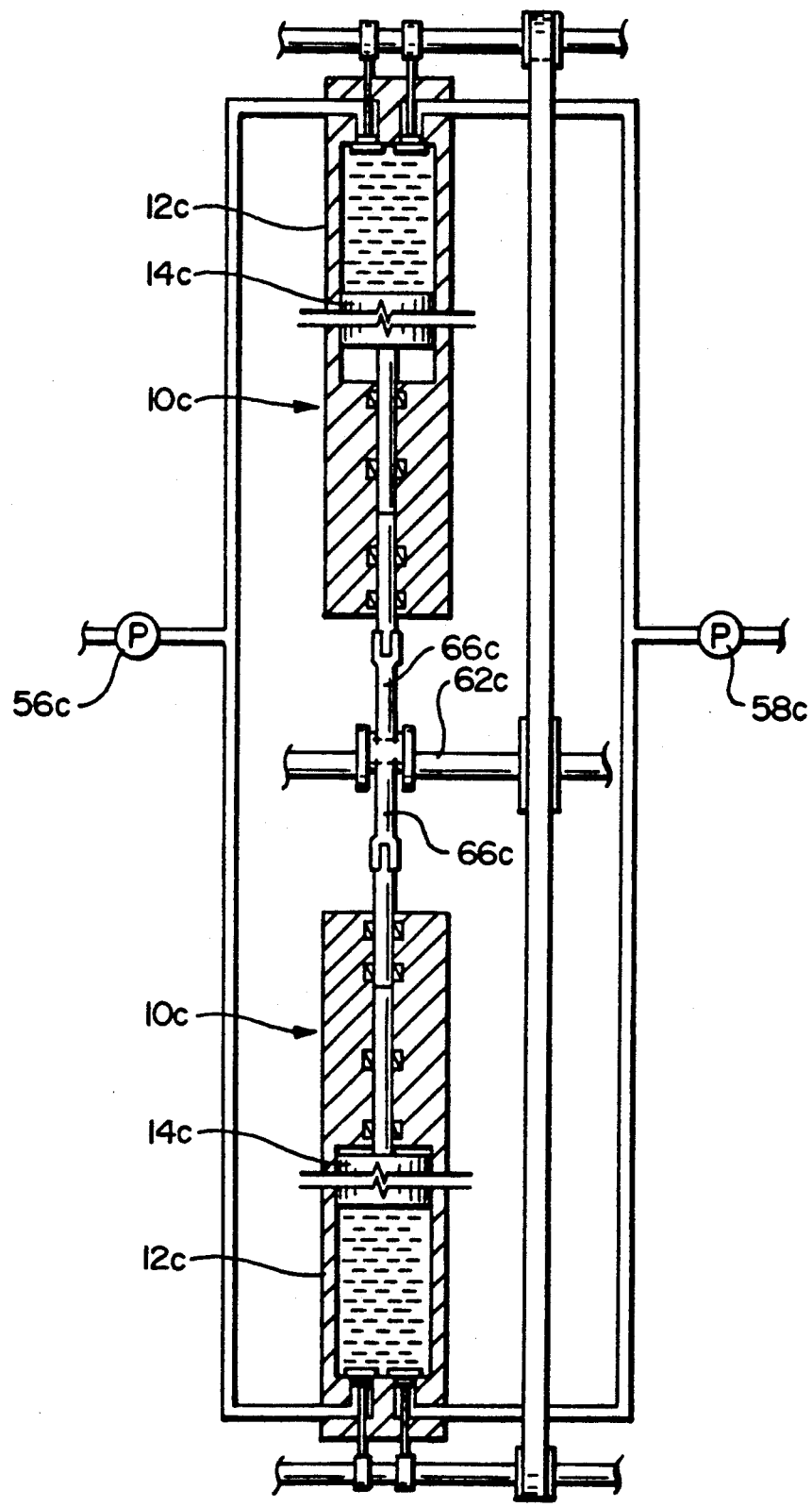
FIGS. 8 is a schematic drawing showing a fourth embodiment of the present invention where there are two oppositely disposed cylinder and plunger assemblies.

The fourth embodiment is illustrated in FIG. 8. Components of this fourth embodiment which are similar with the components in the earlier embodiments will be given like numerical designations with a "c" suffix distinguishing this from the components of the prior embodiments.

This fourth embodiment is similar to the second embodiment shown in FIGS. 3 through 5, except that the cylinder and plunger assemblies are provided in a diametrically opposed pair. Thus, there are two plunger assemblies 10c each comprising a cylinder 12c and plunger 14c. A crank shaft 62c is positioned between the two cylinder and plunger assemblies 10c to act on oppositely disposed crank arms 66c. Also, an inlet pump 56c and an outlet pump 58c are provided. It is to be understood, of course, that a plurality of such pairs of cylinder and plunger assemblies 10c could be provided as in the second embodiment, with all of these being driven from the crank shaft 62c.

FIG. 9 shows schematically yet a fifth embodiment of the present invention, which would be adapted to be utilized for a batch sterilization. For example, food, medical and other products could be placed in plastic bags, and the bag or bags are loading into a pressure vessel and then pressurized.

FIG. 9 is a schematic drawing showing a main frame 90 having upper and lower plates 92 and 94, with these being joined by two side plates 96, and with these plates 92-96 defining a rectangularly shaped processing area. There is a pressure vessel 98 having a side wall 100, a removable upper end cap 102, and a bottom wall 104. The lower end wall 104 has an inlet/outlet opening 106. When the pressure vessel 98 is positioned within the main frame 90, this opening 106 communicates with a pressurized fluid source, such as a cylinder and plunger assembly, with the connection being indicated at 108 so that the pressure chamber 110 within the vessel 98 can be pressurized. This connection could be a quick disconnect ultra high pressure seal connection.

In operation, the main frame 90 remains stationary. The pressure vessel 98 with the end cap 102 and its pressure inlet is moved as a unit. It can be slid either in or out of a main frame in a linear motion, or rotate about its horizontal axis so as to expose the end cap 102. The purpose of this motion is to provide access to the end cap 102 so that it can be easily opened and closed.

To describe the operation further, the pressure vessel 98 is removed from the processing area of the main frame 90 or rotated therein so as to expose the end cap 102. The end cap 102 is removed, and the packet or packets of material to be sterilized are placed within the chamber 110 of the pressure vessel 98. The end cap 102 is placed securely on the vessel 98 to seal the end of the pressure vessel 98, and the pressure vessel 98 is then inserted into its operating position within the main frame 90. Then pressure is applied by pressurizing and depressurizing the pressure chamber 110. After that the vessel 98 is then moved to provide access to the end cap 102, and the packet or packets are removed. Then the process is repeated.

The main frame 90 is designed to withstand fatigue loads, and it can be made, for example, of fairly inexpensive mild steel. The pressure vessel could desirably be made of an autofretted stainless steel vessel also designed for fatigue loads, and the pressure inlet fitting and the end cap 102 could be similarly constructed. The high pressure seal for the end cap could be made, for example, as a polymer backup ring like delrin, along with an elastomeric O-ring, as is commonly done in the prior art.

In this arrangement, it can be seen that the pressure vessel 98 does not have to withstand the end loads. It is to be understood that there could be provided a plurality of pressure vessels 98 that are moved in and out of the processing area of the main frame 90. Also, there could be two such pressure vessels 98 mounted side by side so that when one pressure vessel 98 is in the frame 90 and being pressurized, the other is outside the frame being unloaded and reloaded with a batch of product which is to be sterilized. One high pressure fluid source could be used to pressurize a number of such pressure vessels 98, or a number of assemblies comprising both the main frame and high pressure vessel or vessels 98 could be used.

There could be a plurality of vessels 98, each of which is pressurized from one of plurality of cylinder and plunger assemblies such as shown in FIGS. 3A–3E and 6A–6E, with the appropriate valving and other apparatus modifications needed for this adaptation. For example, it would not be necessary to have the valving operate for the discharge and filling operation between each set of pressurizing cycles.

It is to be understood that various modifications could be made to the present invention without departing from the basic teachings thereof.

What is claimed:

1. An apparatus to sterilizer a material, said apparatus, comprising:
  a. a cylinder and plunger assembly comprising two pressurizing components, namely a cylinder component and a plunger component, said cylinder component comprising a cylinder housing defining a compression chamber, and said plunger component comprising a plunger mounted in said cylinder housing;
  b. actuating means comprising:
    i. pressurizing power means to cause movement of said assembly on a power stroke path where at least a portion of at least one of said cylinder component and said plunger component moves on a compression stroke to reduce volume of said chamber so as to pressurize material in said chamber to a high pressure level, and move on a return stroke to expand the volume in said chamber so as to reduce the pressure level in said chamber;
    ii. intake and discharge means to cause movement of said assembly on a discharge and intake stroke path where at least a portion of at least one of said cylinder component and said plunger component moves on a discharge stroke to reduce the volume of the chamber by a relatively greater amount relative to said power stroke path to discharge sterilized material from said chamber and to move on an intake stroke to expand the volume of said chamber to admit material to be sterilized into said chamber;
  c. material inlet and outlet means arranged to direct the material to be sterilized into said chamber on said intake stroke and to discharge the sterilized material from said chamber on said discharge stroke.

2. The apparatus as recited in claim 1, wherein, said apparatus further comprises, valve means to open said inlet means and to close said outlet means during the intake stroke, to close said inlet means and open said outlet means on the discharge stroke, and to close both said inlet means and said outlet means during the compression stroke and return stroke.

3. The apparatus as recited in claim 2, wherein said cylinder housing comprises a side wall and an end wall defining said compression chamber, and said plunger moves relative to said side wall and said end wall on both said power stroke path and on said discharge and intake stroke path.

4. The apparatus as recited in claim 3, wherein said valve means is positioned adjacent to the end wall of the cylinder housing.

5. The apparatus as recited in claim 4, wherein said pressurizing power means has an operative connection to said plunger means to cause said plunger component to move on said power stroke path, and said plunger component is arranged to separate a power connection with said pressurizing power means to travel on said discharge and intake stroke path.

6. The apparatus as recited in claim 5, wherein said pressurizing power means comprises cam means engaging said plunger component, and said plunger component is arranged to become disengaged from said cam means during said discharge stroke and said intake stroke.

7. The apparatus as recited in claim 5, wherein said pressurizing power means comprises crank shaft means engaging drive rod means, which in turn is in engagement with said plunger component during said power stroke path, and is disengaged from said plunger component on said discharge stroke and said return stroke.

8. The apparatus as recited in claim 5, wherein said intake and discharge means comprises means to direct material to be sterilized into said chamber to cause said plunger component to move along said intake stroke, and to draw material out of said chamber to cause plunger component to move on said discharge stroke.

9. The apparatus as recited in claim 1, wherein there is a plurality of said cylinder and plunger assemblies, each comprising a cylinder component and a plunger component, each of said cylinder and plunger components being connected to said pressurizing power means in a manner that as pressurizing and power means is delivering power to one of said cylinder and plunger assemblies on the compression stroke, another of said cylinder and plunger components is on the return stroke to receive energy of said material expanding in the related compression chamber and return such energy to said pressurizing power means.

10. The apparatus as recited in claim 9, wherein said pressurizing power means comprises crank shaft means operatively connected to said cylinder and plunger assemblies.

11. The apparatus as recited in claim 9, wherein, said apparatus further comprises valve means for each of said cylinder and plunger assemblies to open said inlet means and to close said outlet means of the cylinder and plunger assembly during the intake stroke, to close said inlet means and open said outlet means on the discharge stroke, and to close both said inlet means and said outlet means during the compression stroke and return stroke.

12. The apparatus as recited in claim 11, wherein each cylinder component comprises a side wall and an end wall defining said compression chamber, and said plunger component moves relative to said side wall and said end wall on both said power stroke path and on said discharge and intake stroke path.

13. The apparatus as recited in claim 12, wherein each of said valve means is positioned adjacent to the end wall of the cylinder housing.

14. The apparatus as recited in claim 13, wherein said pressurizing power means has an operative connection to each of said plunger components to cause said plunger components to move on said power stroke path, and each of said plunger components is arranged to separated a power connection with said pressurizing power means to travel on said discharge and intake stroke path.

15. The apparatus as recited in claim 1, wherein said cylinder housing comprises a side wall and an end wall defining said compression chamber, and said end wall is movable relative to said side wall, in a manner that said end wall moves relative to said side wall along said discharge and intake stroke paths.

16. The apparatus as recited in claim 15, wherein there is a plurality of said cylinder and plunger assemblies, each comprising a cylinder component and a plunger component, each of said cylinder and plunger components being connected to said pressurizing power means in a manner that as said pressurizing power means is delivering power to one of said cylinder and plunger assemblies on the compression stroke, another of said cylinder and plunger components is on the return stroke to receive energy of said material expanding in the related compression chamber and return such energy to said pressurizing power means.

17. The apparatus as recited in claim 16, wherein each of said cylinder and plunger assemblies has a valve means positioned in the end wall of each cylinder and plunger assembly.

18. The apparatus as recited in claim 1, wherein said assembly moves through a plurality of cycles of compression strokes and return strokes to sterilize the material, after which the assembly then travels on a discharge and return strokes.

19. A method to sterilize a material, said method comprising:
   a. providing a cylinder and plunger assembly comprising two pressurizing components, namely a cylinder component and a plunger component, said cylinder component comprising a cylinder housing defining a compression chamber, and said plunger component comprising a plunger mounted in said cylinder;
   b. moving said assembly on a power stroke path where at least a portion of at least one of said cylinder component and said plunger component moves on a compression stroke to reduce volume of said chamber so as to pressurize material in said chamber to a high pressure level, and move on a return stroke to expand the volume in said chamber so as to reduce the pressure level in said chamber;
   c. moving said assembly on a discharge and intake stroke path where at least a portion of at least one of said cylinder component and plunger component moves on a discharge stroke to reduce the volume of the chamber by a relatively greater amount relative to said power stroke parth to discharge sterilized material from said chamber and to move on an intake stroke to expand the volume of said chamber to admit material to be sterilized into said chamber.

* * * * *